United States Patent
Hosoe et al.

(10) Patent No.: US 6,540,811 B2
(45) Date of Patent: Apr. 1, 2003

(54) METHOD OF PRODUCING ALLOY POWDERS, ALLOY POWDERS OBTAINED BY SAID METHOD, AND PRODUCTS APPLYING SAID POWDERS

(75) Inventors: Akihisa Hosoe, Osaka (JP); Shinji Inazawa, Osaka (JP); Masatoshi Majima, Osaka (JP); Katsuya Yamada, Osaka (JP); Hiroshi Okazaki, Osaka (JP); Souji Nishikawa, Osaka (JP); Toshio Shimotsuji, Osaka (JP)

(73) Assignees: Sumitomo Electric Industries, Ltd., Osaka (JP); Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 09/759,350

(22) Filed: Jan. 16, 2001

(65) Prior Publication Data

US 2001/0009118 A1 Jul. 26, 2001

(30) Foreign Application Priority Data

Jan. 21, 2000 (JP) .......................................... 2000-013265

(51) Int. Cl.⁷ .................................................. B22F 9/24
(52) U.S. Cl. .............................. 75/348; 75/351; 75/371
(58) Field of Search ............................ 75/348, 351, 371

(56) References Cited

U.S. PATENT DOCUMENTS

| | | | |
|---|---|---|---|
| 4,217,152 A | 8/1980 | Aonuma et al. | 148/108 |
| 4,537,625 A | 8/1985 | Tenhover et al. | 75/0.5 A |
| 5,435,830 A | 7/1995 | Senda et al. | 75/370 |

FOREIGN PATENT DOCUMENTS

| | | |
|---|---|---|
| JP | 60-238406 | 11/1985 |
| JP | 63-274706 | 11/1988 |
| JP | 3-6309 | 1/1991 |
| JP | 002165548 | 1/1991 |
| JP | 11-302709 | 11/1999 |

OTHER PUBLICATIONS

European Search Report dated Jun. 1, 2001.

PCT Notification of Transmittal of Copies of Translation of the International Preliminary Examination Report and International Preliminary Examination Report mailed May 28, 2001.

"Use of Ti(III) Complexes To Reduce Ni,Co, and Fe in Water Solutions", V. V. Sviridov et al., J. Phys. Chem., 1996, vol. 100, No. 50, pp. 19632–19635.

Primary Examiner—George Wyszomierski
(74) Attorney, Agent, or Firm—McDermott, Will & Emery

(57) ABSTRACT

This invention aims at providing a method of obtaining fine alloy powders, which are extremely small in particle size, high in purity, and uniform in composition, providing fine alloy powders obtained by this method, and providing molding materials, slurries, and electromagnetic shielding materials, which use these fine alloy powders. This invention provides a fine alloy powder production method, which is characterized in that after performing the process of mixing at least a trivalent titanium compound and a complexing agent, which binds with the trivalent titanium ion, in an aqueous solution containing two or more types of metal ion, the two or more types of metal are made to deposit simultaneously. This invention also provides fine alloy powders, which are obtained by the above-described method, that are 1 to 100 nm in particle size, and preferably exhibit the characteristics of soft magnetic material, and molding materials, slurries, and electromagnetic shielding materials, produced by dispersing an abovementioned fine alloy powder in a resin.

1 Claim, No Drawings

METHOD OF PRODUCING ALLOY POWDERS, ALLOY POWDERS OBTAINED BY SAID METHOD, AND PRODUCTS APPLYING SAID POWDERS

BACKGROUND OF THE INVENTION

1. Field of the Invention

This invention concerns a method of producing alloy powders of high-purity, extremely small particle size, and excellent uniformity of composition. This invention also concerns alloy powders obtained by the abovementioned method and products, such as molding materials and electromagnetic shielding materials, that use these alloy powders.

2. Description of the Background

Metal powders are used as materials for powder metallurgy. For example, by dispersing a metal powder in a metal or resin, various materials with new characteristics can be obtained. In particular, metal powders of high magnetism can be dispersed in a resin and thereby be used as electromagnetic shielding material or as raw material for various molded objects aimed at shielding electromagnetic waves.

Also, an alloy (a solid solution of two or more metals, an intermetallic compound, or a mixture of such materials) often possesses new characteristics that cannot be obtained with a single type of metal or characteristics that are superior to those of a single type of metal. For example, a 20%Fe–80%Ni alloy (so-called permalloy) is extremely high in magnetic permeability, highly conductive, and thus excellent as an electromagnetic wave absorbing material. This permalloy can thus be made into a powder and dispersed in a resin to be used as the raw material for various molded objects aimed at shielding electromagnetic waves.

Methods of producing such alloy powders include, for example, (a) methods of producing alloy powders from the solid phase, such as by reduction of a solid metal salt (reduction method), etc., (b) methods of producing alloy powders from the liquid phase, such as the precipitation/deposition method, electrolysis method, molten metal atomization method, etc., and (c) methods of producing alloy powders from the gas phase, such as the chemical vapor thermal decomposition method, etc.

However, all alloy powders produced industrially by prior methods have a particle size of a few $\mu$m at the minimum. Presently, it is difficult to obtain alloy powders of extremely small particle size in the order of a few dozen to a few hundred nanometers on an industrial scale.

Meanwhile, with electromagnetic shielding materials that are obtained, for example, by dispersing a metal powder of high magnetism in a resin, it is known that by using a metal powder of smaller particle size, the gaps between particles can be narrowed (the metal powder can be filled more densely) and, as a result, increase the shield effect.

Also with electromagnetic shielding materials obtained by dispersing a metal powder in a resin, a smaller particle size facilitates processing of the material into a thin film, etc. and thereby meet the demands for making more compact and thin electronic equipment, which use such materials. Moreover, in the case where the metal powder is a material of high magnetic permeability, adequate absorption of electromagnetic waves can be anticipated even with a thin film.

The production of microparticles of the abovementioned permalloy and other alloy powders on an industrial scale is thus in demand for the above reasons.

Also, alloy powders of prior methods tend to cluster with contents rich of a specific element. It was thus difficult to obtain uniform composition and to obtain alloys of high purity. Such problems can inhibit the inherent characteristics of an alloy that can be obtained if the composition is uniform and the purity is high.

SUMMARY OF THE INVENTION

The first object of this invention is to provide a method of producing fine alloy powders that are high in purity and uniform in composition.

Other objects of this invention are to provide alloy powders made by the abovementioned method and provide application products, for example, molding materials, slurries, and electromagnetic shielding materials, that make use of these alloy powders.

As a result of continued active research towards achieving the above objects, the present inventors have made a completely new finding. By carrying out the process of mixing at least a trivalent titanium compound, which serves as a reducing agent, and a complexing agent, which binds with the trivalent titanium ion to form a coordination compound, in an aqueous solution containing two or more types of metal ion and thereafter causing the two or more types of metal to deposit simultaneously, an alloy powder comprised of the abovementioned two or more types of metal can be formed and the alloy powder thus formed can be made 1 to 100 nm, in other words, extremely small in particle size, high in purity, and uniform in composition. The present inventors have thus come to complete this invention.

The fine alloy powder production method by this invention is characterized in that after performing the process of mixing at least a trivalent titanium compound and a complexing agent, which binds with the trivalent titanium ion, in an aqueous solution containing two or more types of metal ion, the two or more types of metal are made to deposit simultaneously. With the trivalent titanium compound, which acts as the reducing agent in this invention, the potential difference (the potential difference based on the standard electrode potential, hereinafter referred to simply as the "potential difference") of the oxidation of trivalent titanium [Ti(III)] to quadrivalent titanium [Ti(IV)] is 0.04V in a neutral aqueous solution. Meanwhile, for example, the potential difference of the reduction of bivalent nickel [Ni(II)] to metal nickel [Ni(0)] is 0.257V and the potential difference of the reduction of bivalent iron [Fe(II)] to metal iron [Fe(0)] is 0.440V. Since the potential difference of oxidation of trivalent titanium [Ti(III)] to quadrivalent titanium [Ti(IV)] is less than the potential difference of a reduction of bivalent nickel [Ni(II)] to metal nickel [Ni(0)] and less than the potential difference of a reduction of bivalent iron [Fe(II)] to metal iron [Fe(0)], when just a trivalent titanium compound is added to an aqueous solution containing bivalent nickel ions and bivalent iron ions, the reduction reactions will not progress and an Ni—Fe alloy will not deposit.

However, with the fine alloy powder production method by this invention, since the trivalent agent binds with a complexing agent to form a coordination compound, the stability of the ion changes, and as a result, the potential difference between Ti(III) and Ti(IV) becomes greater and thus produces a greater potential difference of oxidation of Ti(III) to Ti(IV). For example, when trivalent titanium ion is bound with citric acid as the complexing agent, the potential difference between Ti(III) and Ti(IV) in an aqueous solution of pH 9 becomes 1V or more. This value is extremely large, not only in comparison to the abovementioned potential difference of a reduction of Ni(II) to Ni(0) and the potential difference of a reduction of Fe(II) to Fe(0), but also in comparison to the potential difference of a reduction of other metal ions to zero-valence metal.

Thus by the production method of this invention, metal ions existing in aqueous solution can be reduced adequately and even in the case where two or more types of metal ion exist in a mixture, the two or more types of metal can be deposited without the deposition of just the metal of the lower potential difference and thus as an alloy of uniform composition.

Also, by the production method of this invention, the proportions of the component metals contained in the alloy can be adjusted as needed. For this purpose, the proportions of the two or more types of metal ion contained in the aqueous solution are simply adjusted as needed.

Normally when the potential differences of a reduction of the respective metals differ greatly, the more noble metal, which is lower in potential difference, deposits with priority. Even in such a case, by complexing the metal ions and shifting the potential difference of a reduction to a higher value, the potential difference of a reduction of the respective metals is lowered, thereby enabling the deposition of a plurality of metals, in other words, deposition as an alloy.

For example, in the case where an alloy of Ni and Fe is to be deposited, the two species cannot be deposited as alloys in the condition where the Ni (II) ion and Fe (II) ion are hydrated in the aqueous solution to form aquocomplexes. However, if, for example, ammonia and citric acid are added, a complex of a complex structure is formed by the water molecules, ammonia, and citric acid. As a result, the potential difference of a reduction of Ni and Fe is lowered and these species are deposited as alloys.

The reduction reaction of a metal ion may also be started by using palladium or other metal catalyst.

However, if the change of valence of titanium is used and causes the metal ion reduction reactions as in the above-described production method of this invention, the reaction can be made to progress without the use of palladium or other precious metal catalyst, and thus, the mining of impurities due to the use of the abovementioned catalyst is restricted, and a fine alloy powder of extremely high purity can be obtained.

As mentioned above, a trivalent titanium compound is used in the above-described production method of this invention. Since the oxidation reaction from Ti(III) to Ti(IV) is dependent on pH, adding a known base of various types, such as ammonia water, a carbonate, such as sodium carbonate, potassium carbonate, etc., or a hydroxide, such as sodium hydroxide, potassium hydroxide, etc., to the aqueous solution containing two or more types of metal ion to thereby increase the pH of the aqueous solution causes the generation of nuclei for the reduction reactions of the abovementioned metal ions to occur throughout the abovementioned aqueous solution.

Also, using a trivalent titanium compound as the reducing agent enables the generation of nuclei for the reduction reactions to progress with priority over the growth of nuclei so that there is minimal growth of the deposited nuclei. This is because trivalent titanium exhibits minimal self-catalysis that promotes further deposition onto deposited metal. The fine alloy powders that are obtained by the above-described production method of this invention therefore consist of extremely small particles of 1 to 100 nm particle size.

DESCRIPTION OF THE PREFERRED EMBODIMENT

As has been described above, the fine alloy powder, which is obtained by the method of this invention, in other words, the method in which after carrying out the process of mixing at least a trivalent titanium compound and a complexing agent that binds with trivalent titanium ion in an aqueous solution containing two or more types of metal ion, the two or more types of metal are deposited simultaneously, is characterized in having a particle size of 1 to 100 nm.

The average particle size is approximately 50 nm.

The abovementioned fine alloy powder consists of primary particles and the fine alloy powder may be joined in a chain-like manner to form secondary particles.

Examples of metal elements that comprise the fine alloy powder obtained by the above-described method of this invention include nickel, iron, cobalt, manganese, and molybdenum.

Of the above, a fine alloy powder comprised of nickel and iron, or more specifically, so-called permalloy, with which iron comprises 10 to 30 weight % of the entirety and nickel comprises the remainder, is extremely high in magnetic permeability, excels as a soft magnetic material, and is thus favorably used in magnetic shielding materials, etc.

The characteristics of soft magnetic material can be added to the fine alloy powders obtained by the above-described method of this invention by suitably adjusting the types of component elements and their content ratios.

A fine alloy powder that exhibits the characteristics of soft magnetic material preferably exhibits a coercive force of 3000 A/m or less and more preferably 100 A/m or less. The magnetic permeability of such a fine alloy powder is preferably 100 or more and more preferably 1000 or more.

When the coercive force of the fine alloy powder exceeds the above range, the alloy powder exhibits the characteristics of a hard magnetic material and may become unsuitable for application to, for example, an electromagnetic shielding material. Also, when the magnetic permeability of the fine alloy powder falls below the abovementioned range, it lowers the response to changes of the magnetic field applied from the exterior and may possibly cause the alloy powder to become unsuitable for application to, for example, an electromagnetic shielding material.

The fine alloy powder of the above-described method of this invention is obtained without the use of palladium or other expensive precious metal catalyst and is therefore restricted in the mixing of impurities due to the use of such catalysts.

The amount of palladium that is mixed is restricted to 10 ppm or less.

In the case where the fine alloy powder obtained by the method of this invention is a fine alloy powder containing nickel, since neither sodium hypophosphite nor sodium borohydride, which are used conventionally in the reduction reaction of nickel, is used as the reducing agent in the production process, the amounts of phosphorus and boron that are mixed in will be restricted respectively to 10 ppm or less.

Examples of the trivalent titanium compound to be used as the reducing agent in the fine alloy powder production method of this invention include titanium trichloride ($TiCl_3$), mixtures of titanium trichloride and titanium tetrachloride, etc. Though the specific reasons are not dear, with the fine alloy powder production method of this invention, the amount of titanium oxide, which originates from the trivalent titanium compound, used as the reducing agent, and becomes mixed in, is restricted to an extremely low amount of 100 ppm or less.

The amount of the reducing agent to be contained in the aqueous solution containing two or more types of metal ion for deposition of the fine alloy powder is not restricted in particular. However, if, for example, titanium trichloride is to be used in the form of a dilute aqueous hydrochloric acid solution, the molar concentration of titanium trichloride in the abovementioned aqueous solution is preferably adjusted to be one to two times the molar concentrations of the metal ions to be deposited.

Examples of the complexing agent, which are to bind with the trivalent titanium compound used as the reducing agent in the fine alloy powder production method of this invention, include carboxylic acids, such as citric acid, tartaric acid, nitrilotriacetic acid (NTA), ethylene diamine tetraacetic acid (EDTA), etc., and sodium salts, potassium salts, and ammonium salts of such acids. Ethylene diamine, etc., may also be given as examples.

In the case where an alloy of nickel and iron is to be obtained by the method of this invention, the aqueous solution, containing the nickel (II) ion and iron (II) ion for deposition of the fine alloy powder, preferably has added thereto ammonia, citric acid, gluconic acid, tartaric acid, or other complexing agent to be bound to the Ni (II) ion.

The amount of the abovementioned complexing agent to be contained in the aqueous solution containing two or more types of metal ion for deposition of the fine alloy powder is not restricted in particular. However, if, for example, the complexing agent is citric acid or sodium citrate and the reducing agent is titanium trichloride, the contents are preferably adjusted so that these components will be mutually equivalent in molar amounts.

The fine alloy powders obtained by the method of this invention can, for example, be dispersed in various known types of resin, such as polyethylene (PE), polypropylene (PP), polystyrene (PS), thermoplastic styrene elastomer, etc., and used in the form of molding material.

Also, the fine alloy powders obtained by the method of this invention may be mixed with the binders, etc. given below and presented in the form of a slurry. Such a slurry can, for example, be subjected to spray molding to be used in such applications as the forming of an alloy coating.

The binder to be used to form the abovementioned slurry may be either an inorganic substance or an organic substance.

An inorganic binder such as a sol-gel ceramic, for example, is favorable as a coating material due to its good dispersion properties and good operative properties.

With regard to organic binders, a selection can be made as suitable from among engineering plastics, general-purpose plastics, and rubbers, and such a selection can be made as suited in consideration of the heat resistance and solvent resistance of the object to be coated and the conditions of coating, drying, casting, etc.

Examples of the abovementioned plastics include so-called heat-resistant engineering plastics, such as polyimide (PI), polyamide-imide (PAI), polyether sulfone (PES), polysulfone (PSF), polyether imide (PEI), polycarbonate (PC), polyamide (PA) (in particular, nylon resin), aromatic polyesters (PBI), (PPS), polyether-ether-ketone (PEEK), fluororesins, etc., as well as epoxy resins, melamine resins, urethane resins, meth(acrylic) resins, vinyl chloride resins, polyacetal resins, saturated polyester resins, polyphenylene oxide (PPO), phenol resins, aryl resins, ABS resins, polypropylene (PP), polyethylene (PE), and poly-4-methylpentene-1 (PMP), etc. However, the abovementioned plastics are not limited to these examples.

Examples of the abovementioned rubbers include natural rubber (NR), acrylonitrile-butadiene rubber (NBR), isoprene rubber (IR), nitryl-butadiene rubber (NBIR), chloroprene rubber (CR), styrene-butadiene rubber, urethane rubber, fluororubber, and silicone rubber, etc. However, the abovementioned rubbers are not limited to these examples.

The binders above given as examples are used in the form of an aqueous solution, organic solvent solution, mixed solution of water and organic solvent, or a dispersion in an aqueous medium or organic solvent medium (or mixed medium of these).

A surfactant is preferably added to improve the dispersion property of a fine alloy powder obtained by the method of this invention in the abovementioned binder. It is also preferable to add a compatibilizer or a silane coupling agent, or other surface treatment agent.

Furthermore, in order to control the dispersion condition, a polymer blend or polymer alloy can readily be used. In this case, a polymer given as an example above or another polymer may optionally be used.

Also, a filler may be used in combination and blended for the purpose of providing color to the coat or to reinforce the strength of the coat.

The above-described slurry may be presented in the form of an ordinary polymer composition having various blending agents mixed in.

The content of the fine alloy powder in the above-described slurry is normally set so that the weight ratio of the fine alloy powder with respect to the total amount of fine alloy powder and binder will be 5 to 95 weight %.

The lower limit of the abovementioned content is set according to the specific gravity of the binder and the thick coat application property demanded of the slurry, and though not restricted in particular, if the content falls below the abovementioned range (5 weight %), electromagnetic waves may not be shielded to an adequate level when the slurry is applied to a generally-used coating thickness of a few dozen $\mu$m to approximately 100 $\mu$m. When the coating thickness is of the level of a few dozen $\mu$m, the lower limit of the content is preferably set to 10 weight %. If the coating thickness is of the level of a few dozen $\mu$m and the target is complete shielding of electromagnetic waves, the lower limit of the content is preferably set to 30 weight %.

On the other hand, the upper limit of the abovementioned content is determined according to the coat properties that can be retained by the binder after coating of the slurry, and is set according to the specific gravity of the binder and the property of retention of the fine alloy powder as fillers. Though the upper limit is therefore not restricted in particular, in applications that require minimal mechanical strength, the upper limit of the abovementioned range (95 weight %) is preferable. In cases where minimal mechanical strength for withstanding thermal expansion/contraction, vibration, etc. is required, the upper limit of the content is preferably set to 90 weight %. Also, in applications and use in parts requiring adequate resistance against thermal expansion/contraction, vibration, etc. and some degree of flexibility as well, the upper limit of the content is preferably set to 60 weight %.

In the case where the fine alloy powder obtained by the method of this invention exhibits the characteristics of a soft magnetic material, the fine alloy powder can be dispersed in a resin and molded to provide an electromagnetic shielding material, which, though being thin, exhibits excellent shielding effects.

The content of the fine alloy powder in an above-described molding material or electromagnetic shielding material is not restricted in particular and is set suitably in accordance with the corresponding application.

This invention shall now be explained more specifically below by way of examples and comparative examples.

Production of Fine Alloy Powder

EXAMPLE 1

A solution, containing 22 g/L of nickel sulfate, 40 g/L of sodium citrate, 2 g/L of iron sulfate, 20% titanium trichloride, and 60 mL/L of dilute aqueous hydrochloric acid solution, was prepared and heated to 70° C. Then while stirring this solution, 100 mL/L of ammonia water was added to increase the pH and start deposition of the fine alloy powder. After setting it aside for 10 minutes, the powder was recovered by a centrifugal separator. The powder that was obtained was washed with pure water, recovered again by a centrifugal separator, and then heated to 120° C. to remove the water to thereby obtain the fine alloy powder.

When the fine alloy powder thus obtained was observed by a scanning electron micrograph, the particle size of the smaller particles was found to be 10 to 12 nm, the average particle size was found to be 50 nm, and particles greater than 100 nm were not observed.

Chemical analysis upon dissolution of the fine alloy powder obtained showed that the composition of the powder was 60 weight % nickel (Ni) and 40 weight % iron (Fe).

Comparative Example 1

An alloy powder was made by the atomization method. That is, using a vertical water spraying device, a molten alloy of Fe—78% Ni was atomized to prepare an alloy powder.

Observation of the obtained alloy powder by scanning electron micrograph showed the average particle size to be 50 μm (50000 nm).

Comparative Example 2

An Fe—Ni alloy powder was produced by the so-called reduction method.

That is, a mixed aqueous lead sulfate solution of iron (Fe) and nickel (Ni) was prepared so that the weight ratio of Fe to Ni would be 2:8, and a sodium oxalate solution was added to obtain a solid precipitate of Fe and Ni in an oxalate salt. This precipitate was then heated to 380° C. in a hydrogen atmosphere and reduced to obtain an alloy powder of 80 weight % Ni and 20 weight % Fe.

Observation of the obtained alloy powder by scanning electron micrograph showed the average particle size to be 5 μm (5000 nm).

As is dear from the above descriptions of the example 1, and the comparative example 1 and 2, whereas a fine alloy powder of extremely small particle size was obtained in the example 1, the alloy powders obtained in the comparative example 1 and 2 had particle sizes of a few thousand to a few ten thousand times that of the powder of the example 1.

Since the atomization method of the comparison example 1 is a method in which two or more types of metal are melted once and then solidified to obtain a fine powder, the drawback is that, in addition to the increase in the particle size of the alloy powder, there is decreased uniformity of the alloy composition in the alloy powder. Since the reduction method of the comparative example 2 is a method in which metal ions, which have been dispersed in solution, are aggregated and solidified to produce an alloy powder, though the uniformity of the alloy powder is higher than in the abovementioned case of the atomization method, the adjustment of granularity during solid formation is difficult and the particle size of the powder alloy cannot be decreased.

Production of Molding Material

EXAMPLE 2

A solution, containing 22 g/L of nickel sulfate, 40 g/L of sodium citrate, 1 g/L of iron sulfate, 20% titanium trichloride, and 15 mL/L of a dilute aqueous hydrochloric acid solution, was prepared and the temperature thereof was adjusted to 30° C. Then while stirring this solution, 100 mL/L of ammonia water was added to increase the pH and start deposition of the fine alloy powder. After setting it aside for 10 minutes, the powder was recovered by a centrifugal separator. The obtained powder was washed with pure water, recovered again by a centrifugal separator, and then heated to 120° C. to remove the water to thereby obtain the fine alloy powder.

Chemical analysis upon dissolution of the fine alloy powder obtained showed that the composition of the powder was 80 weight % nickel (Ni) and 20 weight % iron (Fe).

The obtained powder was furthermore kneaded in butyl rubber, and the resulting compound was processed into a sheet-like form of 0.1 mm thickness by a roll and then wound once around an LCD video cable.

Comparative Example 3

An electromagnetic wave absorbing (DRP) sheet of 0.5 mm thickness (obtained by kneading flat, soft magnetic powder of 20 μm average particle size and 1 μm thickness in rubber), made by Daido Steel Co., Ltd., was wound once around an LCD video cable.

Measurements of the electromagnetic radiation noise of cables connected to an LCD video deck were made before and after covering the abovementioned cables with the above-described sheets obtained in the example 2 and the comparative example 3.

Noise of a high level of 48 dB in the vicinity of a frequency of 200 MHz was observed prior to covering with the sheets. When the sheet of the example 2 was wound around the cable, the level of the noise became 30 dB (the noise was lowered by 18 dB). Meanwhile, when the sheet of the comparative example 3 was wound around the cable, the level of the noise became 35 dB (the noise was lowered only by 13 dB).

Production of Slurry

EXAMPLE 3

125 g of the fine Ni—Fe alloy powder, obtained in the example 2, was added to 500 g of a water dispersible polyester [trade name, "Byronal MD 1220"; made by Toyobo Co., Ltd.], with a solids concentration of 25 weight %, butyl cellosolve content of 15 weight %, and a water content of 60 weight %, and a homogenizer was used to stir the mixture at 5000 rpm for approximately 30 minutes. During the stirring, cooling was performed with a water bath to keep the contents substantially at room temperature. A dispersion, with which the weight ratio of the fine alloy powder in the solids was 50 weight %, was thus obtained.

Also, besides changing the amount of fine alloy powder added, the same procedure as the above was carried out to obtain a dispersion, with which the weight ratio of the fine alloy powder in the solids was 30 weight %.

EXAMPLE 4

100 g of polyether-imide resin [trade name, "Ultem 1000"; made by GE Corp.] was dissolved in 600 g of tetrahydrofuran (LHF) to obtain a solution.

Separately, 60 g of fluorine surfactant ["DS401"; made by Daikin Industries Co., Ltd.] was added to 300 g of THF and a homogenizer was used to perform stirring at 5000 rpm for 5 minutes to obtain an adequately dispersed surfactant dispersion.

100 g of the fine alloy powder obtained in the example 1 were added to this surfactant dispersion and then a homogenizer was used to perform stirring at 5000 rpm for approximately 30 minutes under cooling by a water bath to obtain a dispersion of the fine alloy powder.

The above-described solution was then added to this fine alloy powder dispersion and further stirring was performed for approximately 30 minutes to obtain a solution of polyether-imide with fine alloy powder dispersed therein and with which the weight ratio of the fine alloy powder in the solids was 30 weight %.

The dispersion obtained in the example 3 described above and the polyether-imide solution obtained in the example 4 were respectively loaded into air sprays and coated onto the inner parts of the frames of notebook personal computers so that the film thickness would be of a prescribed value upon drying.

After coating, air drying was carried out at 130° C. for 15 minutes in the case of the dispersion of the example 3 and at room temperature for 30 minutes in the case of the solution of the example 4, and further drying for 15 minutes at 80° C. was carried out in both cases to form coats.

Electromagnetic noise measurements of the above-described coats showed that whereas prior to the forming of the coat of the abovementioned dispersion or solution, the electromagnetic waves radiated from each notebook personal computer was such that the level of the 200 MHz component was 50 dB $\mu$/m and the level of the 190 MHz component was 40 dB $\mu$/m, after the abovementioned coats were formed to achieve a film thickness of 30 $\mu$m, the level of the 200 MHz component became 34 dB $\mu$/m and the level of the 190 MHz component was 30 dB $\mu$/m with both the example 3 and 4, indicating that in both cases, the radiating electromagnetic waves were attenuated adequately.

What is claimed is:

1. A method of producing fine alloy powders, the method comprising: mixing at least a trivalent titanium compound and a complexing agent, which binds with the trivalent titanium ion, in an aqueous solution containing ions of two or more different metals, wherein the complexing agent is selected from the group consisting of sodium salts, potassium salts and ammonium salts of citric acid; and depositing the two or more different metals simultaneously by increasing the pH of the aqueous solution.

* * * * *